(12) United States Patent
Cao

(10) Patent No.: US 11,144,330 B2
(45) Date of Patent: Oct. 12, 2021

(54) ALGORITHM PROGRAM LOADING METHOD AND RELATED APPARATUS

(71) Applicant: Shenzhen Intellifusion Technologies Co., Ltd., Guangdong (CN)

(72) Inventor: Qingxin Cao, Guangdong (CN)

(73) Assignee: Shenzhen Intellifusion Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/257,302

(22) PCT Filed: Nov. 28, 2019

(86) PCT No.: PCT/CN2019/121523
§ 371 (c)(1),
(2) Date: Dec. 31, 2020

(87) PCT Pub. No.: WO2020/134830
PCT Pub. Date: Jul. 2, 2020

(65) Prior Publication Data
US 2021/0247987 A1    Aug. 12, 2021

(30) Foreign Application Priority Data

Dec. 29, 2018  (CN) .......................... 201811641790.6

(51) Int. Cl.
*G06F 9/46*  (2006.01)
*G06F 9/445*  (2018.01)
*G06F 9/48*  (2006.01)

(52) U.S. Cl.
CPC ................ *G06F 9/445* (2013.01); *G06F 9/48* (2013.01)

(58) Field of Classification Search
CPC .................................. G06F 9/445; G06F 9/48
See application file for complete search history.

(56) References Cited

U.S. PATENT DOCUMENTS 6,920,543 B1 * 7/2005 Greicar ............... G06F 9/44521
711/123
2020/0065646 A1 * 2/2020 Mahmoud .......... G06K 9/00986

FOREIGN PATENT DOCUMENTS

CN        101114020 A    1/2008

* cited by examiner

*Primary Examiner* — Diem K Cao

(57) ABSTRACT

An algorithm program loading method and a related apparatus are provided. The method includes: determining basic storage capacity of a second storage resource; obtaining an algorithm program, determining whether the algorithm capacity of the algorithm program is greater than the basic storage capacity, and if the algorithm capacity of the algorithm program is greater than the basic storage capacity, segmenting the algorithm program by taking the basic storage capacity as a unit to obtain algorithm subprograms; controlling a direct memory access module to load a master control program of a neural network processor to a first storage resource and executing the master control program; and controlling the direct memory access module to load the first algorithm subprogram in the algorithm subprograms to the second storage resource, confirming that the loading of the first algorithm subprogram is completed, executing the first algorithm subprogram, and loading in parallel a second algorithm subprogram.

7 Claims, 3 Drawing Sheets

ALGORITHM PROGRAM LOADING METHOD AND RELATED APPARATUS

CROSS-REFERENCE TO RELATED APPLICATION

This application claims priority to Chinese Patent Application No. 201811641790.6, entitled "ALGORITHM PROGRAM LOADING METHOD AND RELATED APPARATUS" and filed on Dec. 29, 2018, the content of which is hereby incorporated by reference in its entirety.

BACKGROUND

1. Technical Field

The present disclosure generally relates to processors field, and especially relates to an algorithm program loading method and a related apparatus.

2. Description of Related Art

With the development of social science and technology, processors are used in a variety of electronic devices. Usually, when the processor is caused to perform relevant operations, the processor is configured to first read operation instructions from a memory, and then perform to load the operation instructions, and finally perform corresponding actions according to program codes in the operation instructions.

Because the processor is configured to read the operation instructions, load the operation instructions, and perform the operation instructions in turn, thereby a longer time and less efficient for the processor to perform the relevant operations are occurred.

SUMMARY

The technical problems to be solved: in view of the shortcomings of the related art, the present disclosure provides to an algorithm program loading method and a related apparatus, which can realize a parallel processing of a loading an algorithm program and an execution of the algorithm program via a combination of a storage resource module and a direct memory access module.

In a first aspect, an algorithm program loading method according to an embodiment of the present disclosure is used for a neural network processor, the neural network processor including a storage resource and a direct memory access module, the storage resource including a first storage resource and a second storage resource, the algorithm program loading method includes:

determining a basic storage capacity of the second storage resource;

obtaining an algorithm program and determining whether an algorithm capacity of the algorithm program is greater than the basic storage capacity, if the algorithm capacity of the algorithm program is greater than the basic storage capacity, segmenting the algorithm program by taking the basic storage capacity as a unit to obtain algorithm subprograms;

controlling the direct memory access module to load a master control program of the neural network processor to the first storage resource and executing the master control program; and controlling the direct memory access module to load a first algorithm subprogram of the algorithm subprograms to the second storage resource, confirming that the loading of the first algorithm subprogram is completed, and executing the first algorithm subprogram and loading in parallel a second algorithm subprogram.

In a second aspect, a device according to an embodiment of the present disclosure includes a main processor and a neural network processor;

the main processor configured to determine a basic storage capacity of a second storage resource module; determine whether an algorithm capacity of an algorithm program is greater than the basic storage capacity; segment the algorithm program by taking the basic storage capacity as an unit to obtain algorithm subprograms, if the algorithm capacity of the algorithm program is greater than the basic storage capacity; and control a loading and an execution of the algorithmic program; and the neural network processor including a storage resource module and a direct memory access module, and configured to execute a master control program; and control the direct memory access module to load a first algorithm subprogram of the algorithm subprograms to a second storage resource, confirm that the loading of the first algorithm subprogram is completed, and execute the first algorithm subprogram and load in parallel a second algorithm subprogram.

In a third aspect, a chip according to an embodiment of the present disclosure includes a processor as described in the second aspect above, the chip can be operated to cause a computer to implement the algorithm program loading method in the first aspect above.

In a fourth aspect, a computer readable storage medium according to an embodiment of the present disclosure is configured to store computer programs for electronic data interaction, the computer programs performed by a computer to implement the algorithm program loading method in the first aspect above.

In a fifth aspect, a computer product according to an embodiment of the present disclosure includes a non-instantaneous computer readable storage medium that stores computer programs therein, the computer program performed by a computer to implement the algorithm program loading method in the first aspect above.

The present disclosure provides the advantages as below.

It can be seen that, by providing a code loading method and a related apparatus according to an embodiment of the present disclosure, determining a basic storage capacity of the second storage resource after the second storage resource is segmented, obtaining an algorithm program and determining whether an algorithm capacity of the algorithm program is greater than the basic storage capacity, if the algorithm capacity of the algorithm program is greater than the basic storage capacity, segmenting the algorithm program by taking the basic storage capacity as an unit to obtain algorithm subprograms; controlling the direct memory access module to load a master control program of the neural network processor to the first storage resource and executing the master control program; and controlling the direct memory access module to load a first algorithm subprogram of the algorithm subprograms to the second storage resource, confirming that the loading of the first algorithm subprogram is completed, and executing the first algorithm subprogram and loading in parallel a second algorithm subprogram. Therefore, a parallel processing of a loading and an execution of the algorithm program can be realized.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

The terms "first", "second", etc. in the description and claims of the present disclosure and the accompanying drawings above are provided to distinguish different objects rather than describing a particular order. In addition, the terms "include" and "have" and any variations of them are intended to cover non-exclusive inclusions. For example, a process, a method, a system, a product, or a device that includes a series of steps or units is not restricted to listed steps or units, but optionally includes steps or units that are not listed, or other steps or units inherent to those processes, methods, products, or devices.

A reference to an "embodiment" herein is implied that particular features, structures or characteristics described in combination with an embodiment can be included in at least one embodiment of the present disclosure. The occurrence of the phrase at various locations in the specification does not necessarily refer to the same embodiment, nor is it an independent or alternative embodiment mutually exclusive from other embodiments. It can be explicitly and implicitly understood by one of ordinary skill in the related art that the embodiments described herein can be combined with other embodiments.

Figure 1:
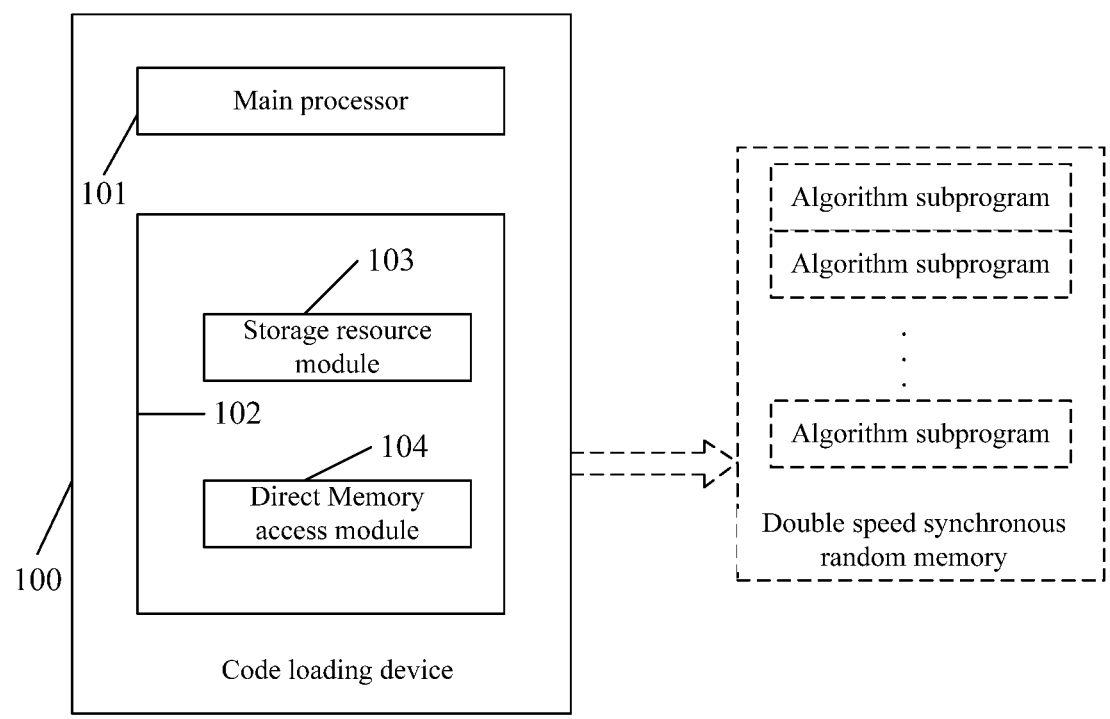
FIG. 1 is a schematic diagram of an algorithm program loading device in accordance with an embodiment of the present disclosure.

FIG. 1 illustrates a schematic diagram of an algorithm program loading device in accordance with an embodiment of the present disclosure. As shown in FIG. 1, the device 100 includes: a main processor 101 and a neural network processor (Neural-network Process Units, NPU) 102. The neural network processor 102 includes: a storage resource module 103 and a direct memory access module (Direct Memory Access, DMA) 104. In an embodiment of the present disclosure, the main processor 101 is an application processor (Application Processor, AP), the storage resource module 103 is a tightly coup memory (Tightly Coup Memories, TCM), the direct memory access module 104 is connected with a double rate synchronous dynamic random access memory (DDR) outside the device, and an algorithm program is stored in the double rate synchronous dynamic random access memory. In other embodiments of the present disclosure, the main processor 101 can be the other type of processors, the storage resource module 103 can be the other type of storage resources, and the direct memory access module 104 can be connected to other memories outside the device.

The main processor 101 is configured to determine a basic storage capacity of a second storage resource; determine whether an algorithm capacity of an algorithm program is greater than the basic storage capacity; segment the algorithm program by taking the basic storage capacity as an unit to obtain algorithm subprograms, if the algorithm capacity of the algorithm program is greater than the basic storage capacity; and control a loading and an execution of the algorithmic program.

Furthermore, obtaining a segmentation value N, according to the segmentation value N, uniformly segmenting a second storage resource module of the storage resource module 103 to obtain N basic storage resources, and determining a storage capacity of each of the N basic storage resources to be the basic storage capacity.

Furthermore, obtaining the algorithm capacity of the algorithm program, and determining whether the algorithm capacity of the algorithm program is greater than the basic storage capacity; if the algorithm capacity of the algorithm program is greater than the basic storage capacity, performing a segmentation action on the algorithm program. The segmentation action includes: according to the basic storage capacity, segmenting the algorithm program to obtain M algorithm subprograms stored successively in the double rate synchronous dynamic random access memory. If the algorithm capacity of the algorithm program is less than the basic storage capacity, the algorithm program is stored in the double rate synchronous dynamic random access memory, rather than being segmented.

The main processor 101 is further configured to start the neural network processor 102, send an execution instruction to the neural network processor 102, and instruct the neural network processor 102 to start executing the master control program and the algorithm subprograms. The master control program is a program stored in the first storage resource module, and the algorithm subprograms are programs stored in the second storage resource module.

The neural network processor 102 includes the storage resource module 103 and the direct memory access module 104 and configured to execute the master control program; and control the direct memory access module 104 to load a first algorithm subprogram of the algorithm subprograms to the second storage resource, confirm that the loading of the first algorithm subprogram is completed, and execute the first algorithm subprogram and load in parallel a second algorithm subprogram.

Furthermore, receiving execution instructions of the main processor 101, starting executing the master control program according to the execution instructions, and monitoring task setting information. If no task setting information is received, the neural network processor 102 will enter a power-saving state; if the task setting information is received, analyzing task parameters according to the task setting information, and executing a task corresponding to the task parameters according to the task parameters. Furthermore, the task setting information includes: loading an algorithm program task and executing the algorithm program task, etc., which is not limited here.

Optionally, the neural network processor 102 is also configured to configure a task of the direct memory access module 104, such task is used to instruct the direct memory access module 104 to transfer algorithm subprograms from the double rate synchronous dynamic random access memory to the storage resource module 103.

Optionally, the storage resource module 103 includes a first storage resource module configured to store the master control program, and a second storage resource module configured to receive the loading of the algorithmic subprograms and store the algorithmic subprograms. The master control program is a program that controls the neural network processor and the algorithmic subprograms are programs stored in the double rate synchronous dynamic random access memory.

Optionally, the storage resource module 103 is connected with the direct memory access module 104 and configured to store the master control program and task programs transferred to the direct memory access module 104 from the double rate synchronous dynamic random access memory. The master control program is stored in the first storage resource module, and the task programs are stored in the second storage resource module.

Optionally, the direct memory access module 104 is configured to obtain the algorithmic program and load the master control program of the neural network processor to the first storage resource module; and load the algorithmic subprograms to the second storage resource.

Furthermore, the direct memory access module 104 is connected with the double rate synchronous dynamic random access memory. The neural network processor 102 is configured to perform the master control program and receive a task instruction included in the master control program, and load a task program corresponding to the task instruction according to the task instruction. Furthermore, the task program includes the algorithmic subprograms in the double rate synchronous dynamic random access memory.

Optionally, the main processor 101 is also configured to send a load task instruction to the direct memory access module 104, instruct the direct memory access module to load the master control program into the storage resource module 103 from the double rate synchronous dynamic random access memory, and store the master control program in the first storage resource module, monitor the master control program and confirm that the master control program is completed to be transferred. The main processor 101 is further configured to send execution instructions to the neural network processor 102. The execution instruction is used to start the neural network processor 102, instruct the neural network processor 102 to start executing the master control program, control the neural network processor 102 to monitor and receive the task setting information, analyze the task parameters according to the task setting configuration, and execute tasks according to the task parameters.

Optionally, the neural network processor 102 is further configured to perform data interaction with the direct memory access module 104 after one algorithmic subprogram is performed by the neural network processor 102. By controlling a first variable and a second variable, where the first variable is used to judge whether the algorithm subprogram is completed to be performed, and the second variable is used to judge whether the algorithm subprogram is completed to be loaded, judging whether a value of the second variable is greater than zero, and determining whether the algorithm subprogram is completed to be loaded. If the algorithm subprogram is completed to be loaded, continuing to execute the algorithm subprogram that is completed to be loaded.

Optionally, the direct memory access module 104 is configured to data interaction with the storage resource module 103. By controlling the first variable and the second variable, judging whether a value of the first variable is greater than zero, and determining whether the algorithm subprogram in the basic storage resource is completed to be performed. If the algorithm subprogram is completed to be performed, it is determined that there is a memory in the basic storage resource that can be used to load the algorithm subprogram in the double rate synchronous dynamic random access memory.

It can be seen that the embodiment of the present disclosure can divide the storage resource into the first storage resource and the second storage resource by combining the storage resource and the direct memory access module. The first storage resource is configured to store the master control program, the second storage resource is uniformly segmented into a plurality of basic storage resources, and the algorithm program is segmented according to a capacity of the basic storage resource to obtain the algorithm subprogram by controlling a compiler. Controlling the execution of the master control program, and controlling the direct memory access module to load the first algorithm subprogram in the algorithm subprogram into the second storage resource. Confirming that the loading of the first algorithm subprogram is completed, and executing the first algorithm subprogram and loading in parallel the second algorithm subprogram. Furthermore, the storage resource is interacted data with the direct memory access module so as to determine whether to continue to execute the algorithm subprogram according to whether the algorithm program is completed to be loaded. At the same time, the direct memory access module is interacted data with the neural network processor so as to determine whether to continue loading the algorithm subprogram according to whether the algorithm subprogram is completed to be executed. The present disclosure can have the advantages of parallel processing of loading and executing the algorithm subprograms, by using a read mechanism that combines the storage resource module and the direct memory access module, thereby it can reduce the usage of auxiliary controllers and other storage resources, avoid read and write errors, save costs and maintain performances of the processor.

Figure 2:
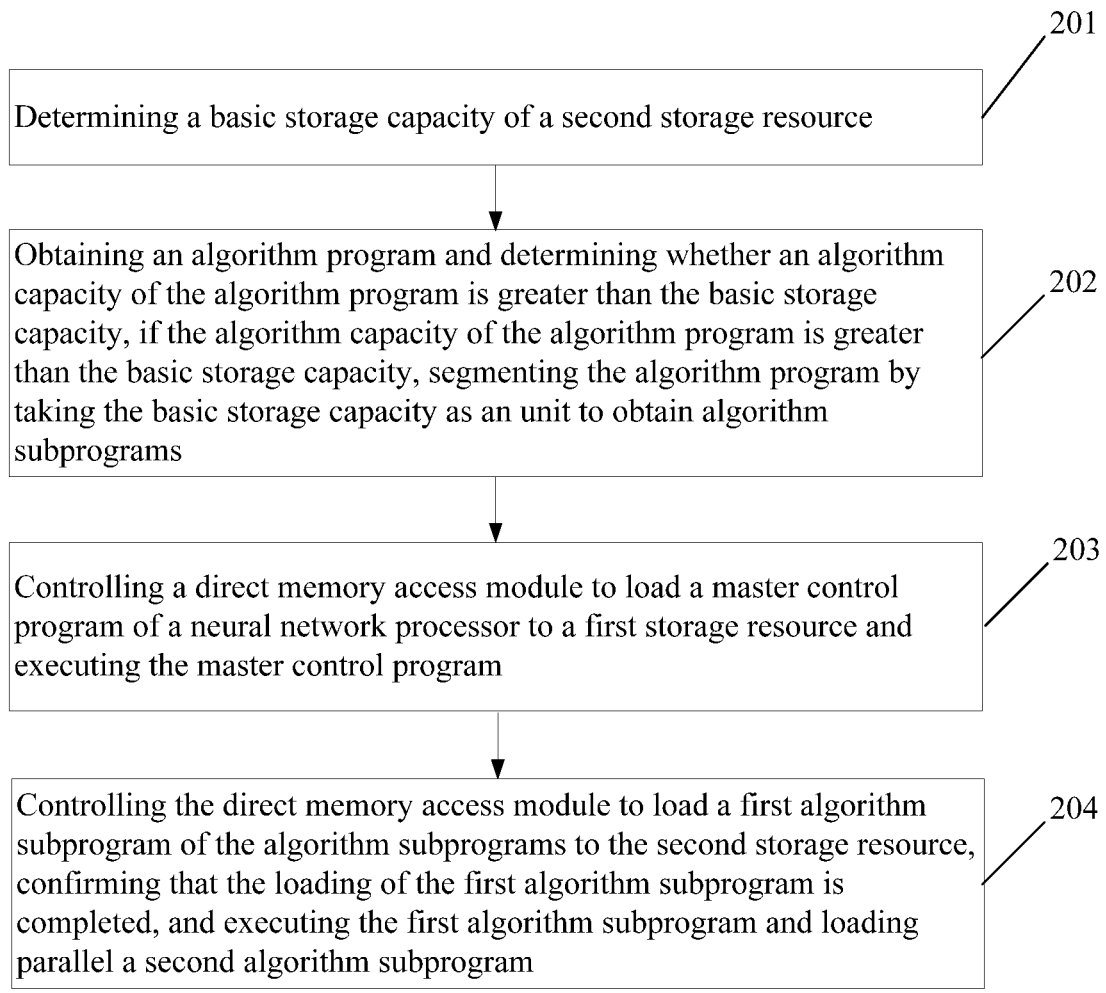
FIG. 2 is a flowchart of an algorithm program loading method in accordance with an embodiment of the present disclosure.

FIG. 2 illustrates a schematic diagram of data interaction in accordance with an embodiment of the present disclosure. The method is used for a neural network processor. As shown in FIG. 2, the method includes:

Step 201, determining a basic storage capacity of the second storage resource.

Optionally, obtaining a segmentation value N, wherein, N>1; obtaining the second storage resource; according to the segmentation value N, uniformly segmenting the second storage resource to obtain N basic storage resources, and determining a storage capacity of the basic storage resource to be the basic storage capacity.

Step 202, obtaining an algorithm program and determining whether an algorithm capacity of the algorithm program is greater than the basic storage capacity, if the algorithm capacity of the algorithm program is greater than the basic storage capacity, segmenting the algorithm program by taking the basic storage capacity as a unit to obtain algorithm subprograms.

Optionally, obtaining an algorithm capacity of the algorithm program in the double rate synchronous dynamic random access memory, determining whether the algorithm capacity of the algorithm program is greater than the basic storage capacity; if the algorithm capacity of the algorithm program is greater than the basic storage capacity, sending a segmenting request to the compiler, the segmenting request is used to request the compiler to segment the algorithm program according to the basic storage capacity so as to obtain M algorithm subprograms, the M algorithm subprograms are successively stored in the double rate synchronous dynamic random access memory. If the algorithm capacity of the algorithm program is less than the basic storage capacity, storing the algorithm program in the double rate synchronous dynamic random access memory rather than segmenting the algorithm program.

Step 203, controlling the direct memory access module to load the master control program of the neural network processor to the first storage resource and executing the master control program.

Optionally, controlling the direct memory access module to load the master control program of the neural network processor to the first storage resource, receiving an execution instruction, starting the neural network processor according to the execution instruction, and instructing the neural network processor to execute the master control program; receiving task setting information, analyzing task parameters according to the task setting information, and executing a task corresponding to the task parameters according to the task parameters. Receiving a task instruction of the master control program and issuing the task instruction to the direct memory access module, the task instruction is used to instruct the direct memory access module to load the algorithm program from the double rate synchronous dynamic random access memory to the storage resource.

Step 204, controlling the direct memory access module to load a first algorithm subprogram of the algorithm subprograms to the second storage resource, confirming that the loading of the first algorithm subprogram is completed, and executing the first algorithm subprogram and loading in parallel a second algorithm subprogram.

Optionally, monitoring the loading of the first algorithm subprogram, starting executing the first algorithm subprogram after confirming that the loading of the first algorithm subprogram is completed. After the loading of the first algorithm subprogram is completed, obtaining a first task configuration which is used to determine whether a load action is performed, determining whether the load action is included in the first task configuration based on the first task configuration; if the load action isn't included in the first task configuration, not sending a pulse signal, the pulse signal is used to increase a value of an variable by one, monitoring the first task configuration until the load action is included in the first task configuration; if the load action is included in the first task configuration, sending a pulse signal to a second variable and increasing a value of the second variable by one.

Furthermore, obtaining a number M of the algorithm subprograms; determining whether the number M is greater than the segmentation value N, if the number M is greater than the segmentation value N, confirming that the loading of the first algorithm subprogram is completed, and executing the first algorithm subprogram and performing parallel a loading step until the M-th algorithm subprogram is completed to be loaded; wherein the loading step includes: determining the x-th algorithm subprogram is completed to be loaded, loading the (x+1)-th algorithm subprogram into the (x+1)-th basic storage resource; wherein x is a positive integer to satisfy the formula: $0<x<N$. Determining that the N-th algorithm subprogram is completed to be loaded, and performing an anti-overflow step, the anti-overflow step includes: before loading the (N+i)-th algorithm subprogram, wherein, $i>0$; obtaining a first task configuration, if a load action is included in the first task configuration, sending a pulse signal to the second variable and increasing the value of the second variable by one, and obtaining a first control instruction, wherein the first control instruction is used to determine whether a first request is sent to the first variable. Determining whether a first set instruction is included in the first control instruction; if the first set instruction is included in the first control instruction, sending the first request to the first variable, the first request is used to determine whether the first variable is equal to zero; receiving a first response and determining whether a signal in the first response is a first signal, wherein the first signal is used to indicate that the first variable is not equal to zero. If the signal in the first response is the first signal, loading the (N+i)-th algorithm subprogram to the i-th basic storage resource and subtracting the value of the first variable by one. If the signal in the first response isn't the first signal, pausing to load the (N+i)-th algorithm subprogram, monitoring the first variable and receiving the first response, and loading the (N+i)-th algorithm subprogram after determining that the first signal is included in the first response.

Furthermore, if the number M isn't greater than the segmentation value N, confirming that the loading of the first algorithm subprogram is completed, executing the first algorithm subprogram and performing parallel a loading step until the M-th algorithm subprogram is completed to be loaded; wherein the loading step includes: determining the x-th algorithm subprogram is completed to be loaded, loading the (x+1)-th algorithm subprogram into the (x+1)-th basic storage resource; wherein x is a positive integer to satisfy the formula: $0<x<N$.

Optionally, before executing the first algorithm subprogram, a confirmation action is performed on the first algorithm subprogram until all algorithm subprograms are completed to be performed. The confirmation action is used to determine that the algorithm subprogram is completed to be loaded Furthermore, the confirmation action includes: assuming that a j-th algorithm subprogram is completed to be performed, receiving a second task configuration information by the neural network processor, determining whether an execution algorithm action is included in the second task configuration according to the second task configuration, wherein the execution action is used to determine whether to continue to execute the algorithm subprograms; if the execution algorithm action is not included in the second task configuration, monitoring the second task configuration until the execution algorithm action is included in the second task configuration; if the execution algorithm action is included in the second task configuration, sending a pulse signal to the first variable to increase the value of the first variable by one; receiving a second control instruction which is used to determine whether to send a second request to the second variable, determining whether a second set instruction is included in the second control instruction; if the second set instruction is included in the second control instruction, sending the second request to the second variable, the second request is used to determine whether the second variable is zero; receiving a second response and determining whether a signal in the second response is a second signal, wherein the second signal is used to indicate that the second variable isn't zero; if the signal in the second response is the second signal, starting executing a (j+1)-th algorithm subprogram and setting j=j+1 and subtracting the value of the second variable by one; if the signal in the second response isn't the second signal, pausing executing the algorithm subprograms, monitoring the second variable and receiving the second response, and starting executing the (j+1)-th algorithm subprogram after determining that the second signal is included in the second response, setting j=j+1 and subtracting the value of the second variable by one.

It can be seen that, in the embodiment of the present disclosure, by determining the basic storage capacity of the second storage resource, obtaining the algorithm program and determining whether the algorithm capacity of the algorithm program is greater than the basic storage capacity, if the algorithm capacity of the algorithm program is greater than the basic storage capacity, segmenting the algorithm program by taking the basic storage capacity as a unit to obtain algorithm subprograms; controlling the direct memory access module to load the master control program of the neural network processor to the first storage resource, executing the master control program, and controlling parallel the direct memory access module to load the algorithm subprograms to the second storage resource; and controlling the direct memory access module to load a first algorithm subprogram of the algorithm subprograms to the second storage resource, confirming that the loading of the first algorithm subprogram is completed, and executing the first algorithm subprogram and loading parallel a second algorithm subprogram, thereby a parallel processing of a loading and an execution of the algorithm program can be realized.

Figure 3:
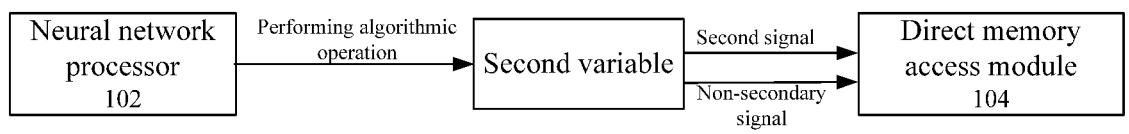
FIG. 3 is a schematic diagram of data interaction in accordance with an embodiment of the present disclosure.

FIG. 3 illustrates a schematic diagram of data interaction in accordance with an embodiment of the present disclosure, applied to the neural network processor 102 and the direct memory access module 104. As shown in FIG. 3, the method includes:

optionally, the neural network processor 102 is interacted data with the direct memory access module 104, wherein, a way of the data interaction is as follows: the algorithm subprograms is controlled to be performed by the neural network processor 102, after each of the algorithm subprograms is performed, performing a confirmation action on the algorithm subprogram.

Furthermore, the confirmation action includes: receiving a second task configuration information by the neural network processor 102, determining whether an execution algorithm action is included in the second task configuration according to the second task configuration; if the execution algorithm action is not included in the second task configuration, monitoring the second task configuration until the execution algorithm action is included in the second task configuration; if the execution algorithm action is included in the second task configuration, sending a pulse signal to the first variable and increasing a value of the first variable by one; receiving a second control instruction and determining whether a second set instruction is included in the second control instruction; if the second set instruction is included in the second control instruction, sending a second request to the second variable, receiving a second response and determining whether a signal in the second response is a second signal, wherein the second signal is used to indicate that the second variable isn't zero; if the signal in the second response is the second signal, starting executing the (j+1)-th algorithm subprogram and setting j=j+1 and subtracting a value of the second variable by one; if the signal in the second response isn't the second signal, pausing executing the algorithm subprograms, monitoring the second variable and receiving the second response, and starting executing the (j+1)-th algorithm subprogram after determining that the second signal is included in the second response, setting j=j+1 and subtracting the value of the second variable by one.

It can be seen that, by performing the data interaction between the neural network processor and the direct memory access module, and by controlling the first variable and the second variable to perform an execution action and a suspension action on the algorithm subprogram, which can realize, during executing the algorithm subprogram, the failure of performing the algorithm subprograms is avoided because the algorithm subprogram is not fully loaded.

Figure 4:
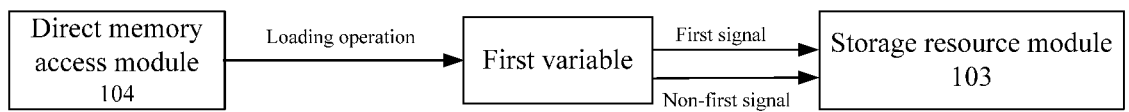
FIG. 4 is a schematic diagram of another kind of data interaction in accordance with an embodiment of the present disclosure.

FIG. 4 illustrates a schematic diagram of another kind of data interaction in accordance with an embodiment of the present disclosure, which is used for the neural network processor 102 and the direct memory access module 104. As shown in FIG. 4, the method includes:

optionally, the neural network processor 102 is interacted data with the direct memory access module 104, a way of the data interaction is as follows: the direct memory access module 104 is configured to obtain a number M of the algorithm subprograms in the double rate synchronous dynamic random access memory; obtaining a segmentation value N, determining whether the number M is greater than the segmentation value N; if the number M isn't greater than the segmentation value N, obtaining M algorithm subprograms from the double rate synchronous dynamic random access memory and successively loading the M algorithm subprograms into the basic storage resource of the second storage resource; if the number M is greater than the segmentation value N, performing an anti-overflow action on the algorithm subprograms.

Furthermore, the anti-overflow action includes: successively loading the first N algorithm subprograms of the M algorithm subprograms into the basic storage resource. Furthermore, After the loading of each of the algorithm subprograms is completed, obtaining a first task configuration which is used to determine whether a load action is continued to be performed, determining whether the load action is included in the first task configuration based on the first task configuration; if the load action isn't included in the first task configuration, not sending a pulse signal, monitoring the first task configuration until the load action is included in the first task configuration; if the load action is included in the first task configuration, sending a pulse signal to a second variable and increasing a value of the second variable by one. Before loading the (N+i)-th algorithm subprogram, wherein, i>0; obtaining the first task configuration, if the load action is included in the first task configuration, sending a pulse signal to the second variable and increasing the value of the second variable by one, and obtaining a first control instruction, wherein the first control instruction is used to determine whether a first request is sent to the first variable. Determining whether a first set instruction is included in the first control instruction; if the first set instruction is included in the first control instruction, sending the first request to the first variable; receiving a first response and determining whether a signal in the first response is a first signal. If the signal in the first response is the first signal, loading the (N+i)-th algorithm subprogram to the i-th basic storage resource and subtracting the first variable by one. If the signal in the first response isn't the first signal, pausing loading the (N+i)-th algorithm subprogram, monitoring the first variable and receiving the first response, and loading the (N+i)-th algorithm subprogram after determining that the first signal is included in the first response.

It can be seen that, by performing the data interaction between the neural network processor and the direct memory access module, and by controlling the first variable and the second variable to load the algorithm subprogram and pause loading the algorithm subprogram, thereby problems of an overwrite and an overflow can be avoided during loading the algorithm subprograms.

A computer readable storage medium according to an embodiment of the present disclosure is configured to store computer programs performed by a computer to implement some or all steps of any of the code-loading methods described in the above embodiments.

A computer product according to an embodiment of the present disclosure is configured to include a non-instantaneous computer readable storage medium that stores computer programs therein, the computer programs performed by a computer to implement some or all steps of any of the code-loading methods described in the above embodiments.

Although a full description of the present disclosure is provided herein in conjunction with the embodiments above mentioned. However, during an implementation of a protection subject matter of the present disclosure, one of ordinary skill in the related art can understand and implement other variations or replacements of the present disclosure by viewing the drawings, the disclosure content, and the attached claims. In the claims, the word "including" (comprising) does not exclude the other component or step, "a" or "one" does not exclude multiple cases. A single processor or other units can perform a plurality of functions listed in the claims. Some measures are recorded in different dependent claims, but that does not mean the measures can't be combined to produce good results.

One of ordinary skill in the related art shall understand that embodiments of the present disclosure can be provided as methods, devices (equipments), or computer program products. Therefore, the present disclosure can be taken as a form of a complete hardware embodiment, a complete software embodiment, or an embodiment in combination with software and hardware. Furthermore, the present disclosure can be taken as a form of a computer program product which is implemented on one or more computer available storage media (including but not limited to a disk memory, a CD-ROM, an optical memory, etc.) including computer available program codes therein. Computer programs are stored/distributed in appropriate media, provided with or as a part of other hardware, or in other distributed forms, such as via the internet or other wired or wireless telecommunications systems.

The present disclosure is described with reference to flowcharts and/or block diagrams of the methods, devices and computer program products of embodiments of the present disclosure. It should be understood that each flow and/or each chart in a flow chart and/or a block diagram and a combination of the flow and/or the chart in the flow chart and/or the block diagram can be implemented by computer program instructions. These computer program instructions can be provided to a processor of a general-purpose computer, a special-purpose computer, an embedded processor or other programmable data-processing devices to produce a device, so that instructions performed by the processor of a computer or other programmable data processing device can produce the device with functions specified in a flow or a plurality of flows in a flowchart and/or a chart or a plurality of charts in a block diagram.

These computer program instructions can also be stored in a computer-readable memory that guides the computer or other programmable data-processing device to work in a particular way, thereby it can cause an instruction stored in the computer-readable memory to produce a waref that an instruction device is included therein, the instruction device can be configured to implement functions specified in a flow or a plurality of flows in a flowchart and/or a chart or a plurality of charts in a block diagram.

These computer program instructions can also be loaded onto a computer or other programmable data-processing devices, so as to cause to perform a series of steps on a computer or other programmable devices in order to produce a computer-realized processing, thus, the instructions executed on a computer or other programmable devices can provide steps to implement the functions specified in a flow or a plurality of flows in a flowchart and/or a chart or a plurality of charts in a block diagram.

Although the features and elements of the present disclosure are described as embodiments in particular combinations, it is obvious that each feature or element can be used alone or in other various combinations within the principles of the present disclosure to the full extent indicated by the broad general meaning of the terms in which the appended claims are expressed. Accordingly, the specification and the drawings are only illustrative descriptions of the present disclosure as defined in the attached claims and are deemed to cover any and all modifications, variations, combinations or equivalents within the scope of the present disclosure. It is obvious that any variation or replacement made by one of ordinary skill in the related art without departing from the spirit of the present disclosure shall fall within the protection scope of the present disclosure. Thus, if such modifications and variations of the present disclosure fall within the protection scope of the present disclosure and its equivalent technologies, the present disclosure is intended to include such modifications and variations.

What is claimed is:

1. An algorithm program loading method used for a neural network processor, the neural network processor comprising a storage resource and a direct memory access module, the storage resource comprising a first storage resource and a second storage resource, the algorithm program loading method comprising:

determining a basic storage capacity of the second storage resource;

obtaining an algorithm program and determining whether an algorithm capacity of the algorithm program is greater than the basic storage capacity, if the algorithm capacity of the algorithm program is greater than the basic storage capacity, segmenting the algorithm program by taking the basic storage capacity as a unit to obtain algorithm subprograms;

controlling the direct memory access module to load a master control program of the neural network processor to the first storage resource and executing the master control program; and controlling the direct memory access module to load a first algorithm subprogram of the algorithm subprograms to the second storage resource, confirming that the loading of the first algorithm subprogram is completed, and executing the first algorithm subprogram and loading parallel a second algorithm subprogram; and wherein the method further comprises:

performing a confirmation action on the first algorithm subprogram until the algorithm program is completed to be performed, the confirmation action comprising:

for a j-th algorithm subprogram in the second storage resource, performing a judging step after determining the j-th algorithm subprogram in the second storage resource is completed, wherein, j>0; the judging step comprising:

obtaining a second task configuration and determining whether an execution algorithm action is included in the second task configuration according to the second task configuration, if the execution algorithm action is not included in the second task configuration, not sending a pulse signal, monitoring the second task configuration until the execution algorithm action is included in the second task configuration;

if the execution algorithm action is included in the second task configuration, sending a pulse signal to the first variable and increasing a value of the first variable by one, obtaining a second control instruction and determining whether a second set instruction is included in the second control instruction; if the second set instruction is included in the second control instruction, sending a second request to the second variable, receiving a second response and determining whether a signal in the second response is a second signal; if the signal in the second response is the second signal, starting executing the (j+1)-th algorithm subprogram and setting j=j+1;

if signal in the second response isn't the second signal, pausing executing the (j+1)-th algorithm subprogram, monitoring the second variable and receiving the second response, and starting executing the (j+1)-th algorithm subprogram and setting j=j+1, after determining that the second signal is included in the second response.

2. The algorithm program loading method as claimed in claim 1,
wherein the step of determining a basic storage capacity of the second storage resource comprises:
obtaining a segmentation value N, wherein, N>1;
obtaining the second storage resource;
according to the segmentation value N, uniformly segmenting the second storage resource to obtain a basic storage resource, and determining a storage capacity of the basic storage resource to be the basic storage capacity.

3. The algorithm program loading method as claimed in claim 1, wherein the step of confirming that the loading of the first algorithm subprogram is completed, and executing the first algorithm subprogram and loading parallel a second algorithm subprogram, comprises:
obtaining number M of the algorithm subprograms;
determining whether the number M is greater than the segmentation value N, if the number M isn't greater than the segmentation value N, confirming that the loading of the first algorithm subprogram is completed to be loaded, and executing the first algorithm subprogram and performing parallel a loading step until a M-th algorithm subprogram is completed to be loaded; wherein the loading step comprising: determining a x-th algorithm subprogram is completed to be loaded, loading a (x+1)-th algorithm subprogram into a (x+1)-th basic storage resource; wherein x is a positive integer to satisfy the formula: 0<x<N.

4. The algorithm program loading method as claimed in claim 3, wherein the method further comprises:
if the number M is greater than the segmentation value N, confirming that the loading of the first algorithm subprogram is completed to be loaded, and executing the first algorithm subprogram and performing parallel a loading step until a N-th algorithm subprogram is completed to be loaded; the loading step comprising: determining the x-th algorithm subprogram is completed to be loaded, loading the (x+1)-th algorithm subprogram into the (x+1)-th basic storage resource; wherein x is a positive integer to satisfy the formula: 0<x<N;

determining that the N-th algorithm subprogram is completed to be loaded, and performing an anti-overflow step, the anti-overflow step comprising:
before loading a (N+i)-th algorithm subprogram, wherein, i>0; obtaining a first task configuration and determining whether a loading action is included in the first task configuration according to the first task configuration, if the loading action is not included in the first task configuration, not sending a pulse signal, monitoring the first task configuration until the loading action is included in the first task configuration;
if the loading action is included in the first task configuration, sending a pulse signal to a second variable and increasing a value of the second variable by one;
obtaining a first control instruction and determining whether a first set instruction is included in the first control instruction; if the first set instruction is included in the first control instruction, sending a first request to a first variable, receiving a first response and determining whether a signal in the first response is a first signal; if the signal in the first response is the first signal, loading the (N+i)-th algorithm subprogram and subtracting the first variable by one;
if the signal in the first response isn't the first signal, pausing loading the (N+i)-th algorithm subprogram, monitoring the first variable and receiving the first response, and loading the (N+i)-th algorithm subprogram after determining that the first signal is included in the first response.

5. A device comprising:
a main processor configured to determine a basic storage capacity of a second storage resource module; determine whether an algorithm capacity of an algorithm program is greater than the basic storage capacity; segment the algorithm program by taking the basic storage capacity as an unit to obtain algorithm subprograms, if the algorithm capacity of the algorithm program is greater than the basic storage capacity; and control a loading and an execution of the algorithmic program; and
a neural network processor comprising a storage resource module and a direct memory access module, and configured to execute a master control program; and
control the direct memory access module to load a first algorithm subprogram of the algorithm subprograms to a second storage resource, confirm that the loading of the first algorithm subprogram is completed to be loaded, and execute the first algorithm subprogram and load parallel a second algorithm subprogram; and wherein
the neural network processor is further configured to:
perform a confirmation action on the first algorithm subprogram until the algorithm program is completed to be performed, the confirmation action comprising:
for a j-th algorithm subprogram in the second storage resource, perform a judging step after determining the j-th algorithm subprogram in the second storage resource is completed, wherein, j>0; the judging step comprising:

obtaining a second task configuration and determining whether an execution algorithm action is included in the second task configuration according to the second task configuration, if the execution algorithm action is not included in the second task configuration, not sending a pulse signal, monitoring the second task configuration until the execution algorithm action is included in the second task configuration;

if the execution algorithm action is included in the second task configuration, sending a pulse signal to the first variable and increasing a value of the first variable by one, obtaining a second control instruction and determining whether a second set instruction is included in the second control instruction; if the second set instruction is included in the second control instruction, sending a second request to the second variable, receiving a second response and determining whether a signal in the second response is a second signal; if the signal in the second response is the second signal, starting executing the (j+1)-th algorithm subprogram and setting j=j+1;

if signal in the second response isn't the second signal, pausing executing the (j+1)-th algorithm subprogram, monitoring the second variable and receiving the second response, and starting executing the (j+1)-th algorithm subprogram and setting j=j+1 after determining that the second signal is included in the second response.

6. The device as claimed in claim 5, wherein the neural network processor comprises the storage resource module and the direct memory access module, the storage resource module comprising a first storage resource module and the second storage resource module, the first storage resource module configured to store the master control program, and the second storage resource module configured to store the algorithmic subprograms;

the direct memory access module configured to obtain the algorithmic program and load the master control program of the neural network processor to the first storage resource module; and load the algorithmic subprograms to the second storage resource.

7. A chip comprising a processor configured to be operated to cause a computer to implement the algorithm program loading method, the method comprising:

determining a basic storage capacity of a second storage resource;

obtaining an algorithm program and determining whether an algorithm capacity of the algorithm program is greater than the basic storage capacity, if the algorithm capacity of the algorithm program is greater than the basic storage capacity, segmenting the algorithm program by taking the basic storage capacity as a unit to obtain algorithm subprograms;

controlling a direct memory access module to load a master control program of a neural network processor to the first storage resource and executing the master control program; and controlling the direct memory access module to load a first algorithm subprogram of the algorithm subprograms to the second storage resource, confirming that the loading of the first algorithm subprogram is completed, and executing the first algorithm subprogram and loading parallel a second algorithm subprogram; and wherein the method further comprises:

performing a confirmation action on the first algorithm subprogram until the algorithm program is completed to be performed, the confirmation action comprising:

for a j-th algorithm subprogram in the second storage resource, performing a judging step after determining the j-th algorithm subprogram in the second storage resource is completed, wherein, j>0; the judging step comprising:

obtaining a second task configuration and determining whether an execution algorithm action is included in the second task configuration according to the second task configuration, if the execution algorithm action is not included in the second task configuration, not sending a pulse signal, monitoring the second task configuration until the execution algorithm action is included in the second task configuration;

if the execution algorithm action is included in the second task configuration, sending a pulse signal to the first variable and increasing a value of the first variable by one, obtaining a second control instruction and determining whether a second set instruction is included in the second control instruction; if the second set instruction is included in the second control instruction, sending a second request to the second variable, receiving a second response and determining whether a signal in the second response is a second signal; if the signal in the second response is the second signal, starting executing the (j+1)-th algorithm subprogram and setting j=j+1;

if signal in the second response isn't the second signal, pausing executing the (j+1)-th algorithm subprogram, monitoring the second variable and receiving the second response, and starting executing the (j+1)-th algorithm subprogram and setting j=j+1, after determining that the second signal is included in the second response.

* * * * *